US008370317B2

(12) United States Patent
Chen et al.

(10) Patent No.: US 8,370,317 B2
(45) Date of Patent: Feb. 5, 2013

(54) SYNCHRONIZING SHARED RESOURCES IN A COLLECTION

(75) Inventors: Boaz Chen, Redmond, WA (US); Shahar Prish, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 11/233,633

(22) Filed: Sep. 22, 2005

(65) Prior Publication Data

US 2007/0067257 A1   Mar. 22, 2007

(51) Int. Cl.
 G06F 7/00 (2006.01)
 G06F 17/00 (2006.01)
 G06F 17/30 (2006.01)
(52) U.S. Cl. ..................................... 707/704; 707/803
(58) Field of Classification Search .................. 707/1, 8, 707/999.008, 803, 704; 710/200
See application file for complete search history.

(56) References Cited

U.S. PATENT DOCUMENTS

| | | | | | |
|---|---|---|---|---|---|
| 5,396,587 | A * | 3/1995 | Reed et al. | ................... | 715/219 |
| 5,761,660 | A * | 6/1998 | Josten et al. | ..................... | 707/8 |
| 5,784,623 | A * | 7/1998 | Srinivasan | ................... | 710/200 |
| 5,893,123 | A * | 4/1999 | Tuinenga | ..................... | 715/209 |
| 6,105,026 | A * | 8/2000 | Kruglikov et al. | ................. | 707/8 |
| 6,157,934 | A * | 12/2000 | Khan et al. | ..................... | 715/234 |
| 6,279,033 | B1 * | 8/2001 | Selvarajan et al. | ............ | 709/217 |
| 6,334,141 | B1 * | 12/2001 | Varma et al. | ................... | 709/205 |
| 6,449,614 | B1 * | 9/2002 | Marcotte | ............................ | 707/8 |
| 6,564,246 | B1 * | 5/2003 | Varma et al. | ................... | 709/205 |
| 7,047,484 | B1 * | 5/2006 | Becker et al. | .................. | 715/201 |
| 7,082,424 | B2 * | 7/2006 | Molnar | ............................. | 707/1 |
| 7,185,340 | B1 * | 2/2007 | Hersh | ............................. | 719/312 |
| 2002/0010743 | A1 * | 1/2002 | Ryan et al. | .................... | 709/205 |
| 2004/0237045 | A1 * | 11/2004 | Meltzer | ......................... | 715/530 |
| 2006/0224946 | A1 * | 10/2006 | Barrett et al. | ................. | 715/503 |
| 2007/0078852 | A1 * | 4/2007 | Chen et al. | ........................ | 707/8 |
| 2008/0028287 | A1 * | 1/2008 | Handsaker et al. | ........... | 715/212 |

OTHER PUBLICATIONS

NA910330, Hierarchical Latching Method—Splitting Locks/Latches to Increase Concurrency. IBM, Technical Disclosure Bulletin, 1991. 1 page.*
Rogue Wave Software, "Threads Module User's Guide", 2003, Chapter 4.4  http://web.archive.org/web/20040826165506/http://www.roguewave.com/support/docs/leif/sourcepro/html/threadsug/4-4.html.*
NCBI, "Introduction to the C++ Toolkit", 2004, pp. (212-213 in pdf file, labeled 55 and 56 in printout)http://0-www.ncbi.nlm.nih.gov.library.vu.edu.au/books/bookres.fcgi/toolkit/toolkit.pdf.*
Morrison, Vince, "Concurrency: What Every Dev Must Know About Multithreaded Apps", 2005, MSDN Magazine http://msdn.microsofl.com/msdnmag/issues/05/08/Concurrency/default.aspx.*
Jim Mischel, "Asynchronous Callbacks", Jan. 1, 2004. available online: http://www.informit.com/guides/content.aspx?g=dotnet&segNum=194.*
Deitel & Deitel, "C++ How to Program", 1998, Prentice Hall, Second Edition, pp. 744-745.*

(Continued)

Primary Examiner — Brannon W Smith

(57) ABSTRACT

Multi-threaded access to a collection is synchronized without locking the collection for long periods of time. In one implementation, a collection is locked briefly to allow safe creation of a resource entry (or a placeholder entry) in the collection and then unlocked prior to the start of the resource build operation. As such, the collection is unlocked during the potentially long period of time required to build the resource (e.g., a data object) into the collection. Furthermore, during the build operation, access attempts to the same resource in the collection by other threads are forced to wait until the resource build is completed. Nevertheless, the collection itself is not locked during the resource build operation, so that other threads can access other resources within the collection without waiting.

13 Claims, 5 Drawing Sheets

OTHER PUBLICATIONS

Jim Gray et al, "Transaction Processing: Concepts and Techniques",1993, Morgan Kaufmann Publishers, Inc., pp. 456-458.*

Paul Goldwater, "Collaborate on spreadsheets: how to share Excel files with other on your network", Jan. 1, 2004, Journal of Acountancy.*

Morrison, V., "Concurrency—What Every Dev Must Know About Multithreaded Apps," Retrieved from MSDN Magazine website <URL: http://msdn.microsoft.com/msdnmag/issues/05/08/Concurrency/default.aspx?print=true, Aug. 2005, 13 pages, Microsoft Corporation, Redmond, Washington.

* cited by examiner

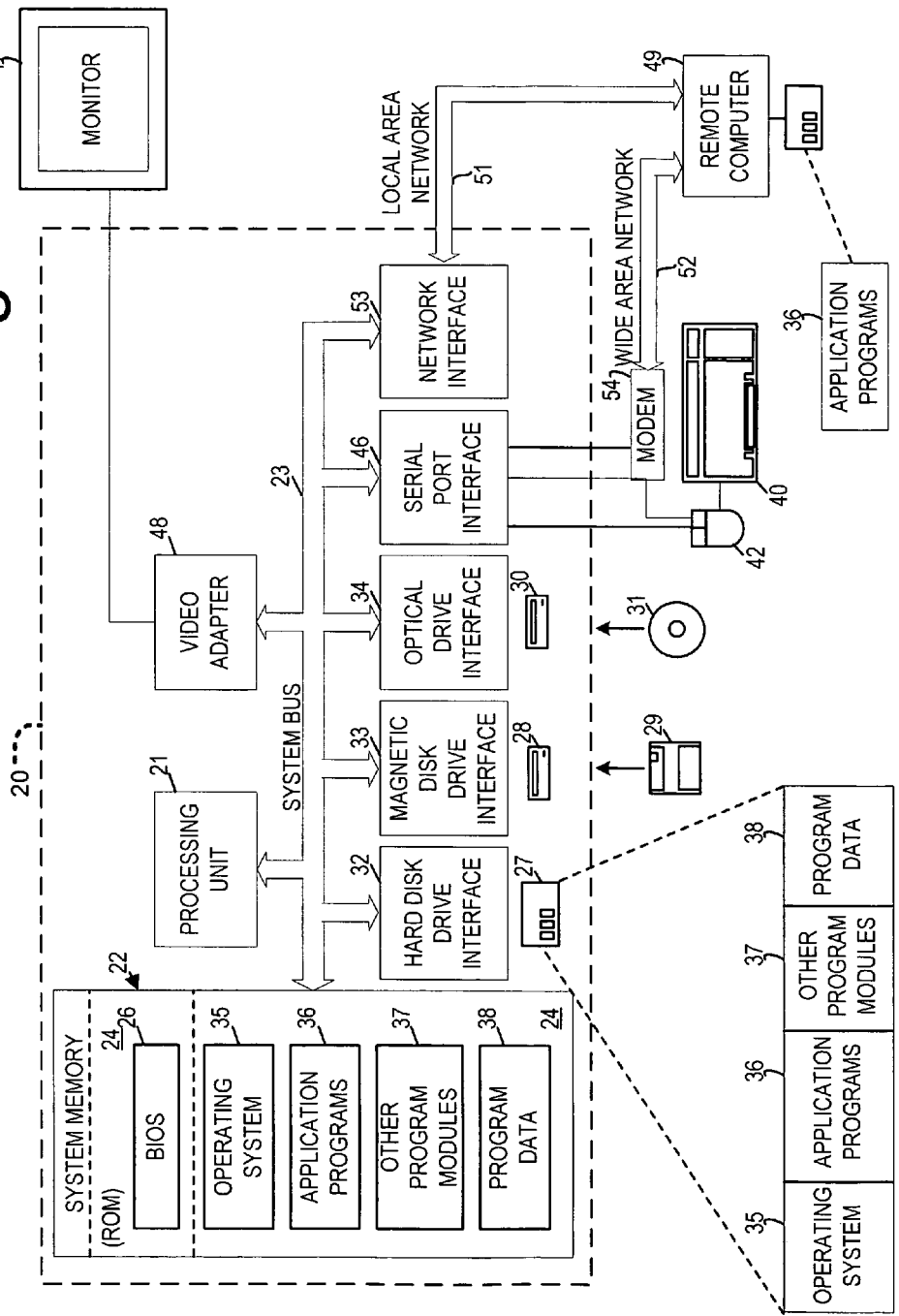

SYNCHRONIZING SHARED RESOURCES IN A COLLECTION

BACKGROUND

Certain server-based applications can be executed by multiple users on one or more servers across a network. For example, rather than running individual applications (e.g., individual spreadsheet applications) on desktop computers, multiple users can access a server over an Intranet through their desktop computers and execute a server-based application (e.g., a server-based spreadsheet application) on that server. Through this server-based application, multiple users can manipulate common functionality and data available on that server.

A typical scenario might include a server-based accounting program that is accessed by multiple accountants from various enterprise departments. The server-based application receives user requests, creates and accesses data objects, performs appropriate computations on these data objects, and renders application-specific presentations of the computation results for display on the users' desktop computers (e.g., through browsers). Furthermore, to avoid the time and resources required to build data objects for each user, once these server-based objects are created they can be shared among multiple users (e.g., in servicing multiple requests).

However, creation of certain complex data objects for a server-based application can be time-consuming and CPU-consuming. For example, in a server-based spreadsheet application, a user may request that a workbook be created for display on his or her desktop computer. In response to the request, the server-based application performs a slow process of building one or more individual worksheet objects and adding them to a "collection" that represents the workbook. The objects can then be rendered for display on the user's system. As they are being built and added to the collection, however, the worksheets objects and/or their contents may be retrieved from various, possibly remote, storage locations. Therefore, the process of building each worksheet object can take a noticeably long amount of time from a user's perspective.

When multiple users (e.g., represented by multiple threads) attempt to access data objects in the same collection, multi-threaded applications synchronize data access to the collection by the multiple threads in order to ensure that an access by one thread does not corrupt an access by another thread. One method of synchronization used in traditional multi-threaded applications is a simple locking mechanism, wherein a first thread that is accessing a data object of the collection takes control of the collection and locks out all other threads. The lock prevents access by any other thread until all of the first thread's accesses to that collection are completed. Thus, if a second thread attempts to access a different data object in the collection during the locked period, access by the second thread is blocked. As a result, the second thread waits unproductively until the collection is available. Accordingly, while simple locking mechanisms can be used in typical multi-threaded applications to synchronize multi-threaded access, these same mechanisms prove too slow for collections in many multi-threaded server-based applications.

SUMMARY

Implementations described and claimed herein address the foregoing problems by synchronizing multi-threaded access to a collection without locking the collection for long periods of time. In one implementation, a collection is locked briefly to allow safe creation of a resource entry (or a placeholder entry) in the collection and then unlocked prior to the start of the resource build operation. As such, the collection is unlocked during the potentially long period of time required to build the resource (e.g., a data object) into the collection. Furthermore, during the build operation, access attempts to the same resource in the collection by other threads are forced to wait until the resource build is completed. Nevertheless, the collection itself is not locked during the resource build operation, so that other threads can access other resources within the collection without waiting.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Other implementations are also described and recited herein.

BRIEF DESCRIPTIONS OF THE DRAWINGS

FIG. 5 illustrates a system that may be useful in implementing the described technology.

DETAILED DESCRIPTIONS

Figure 1:
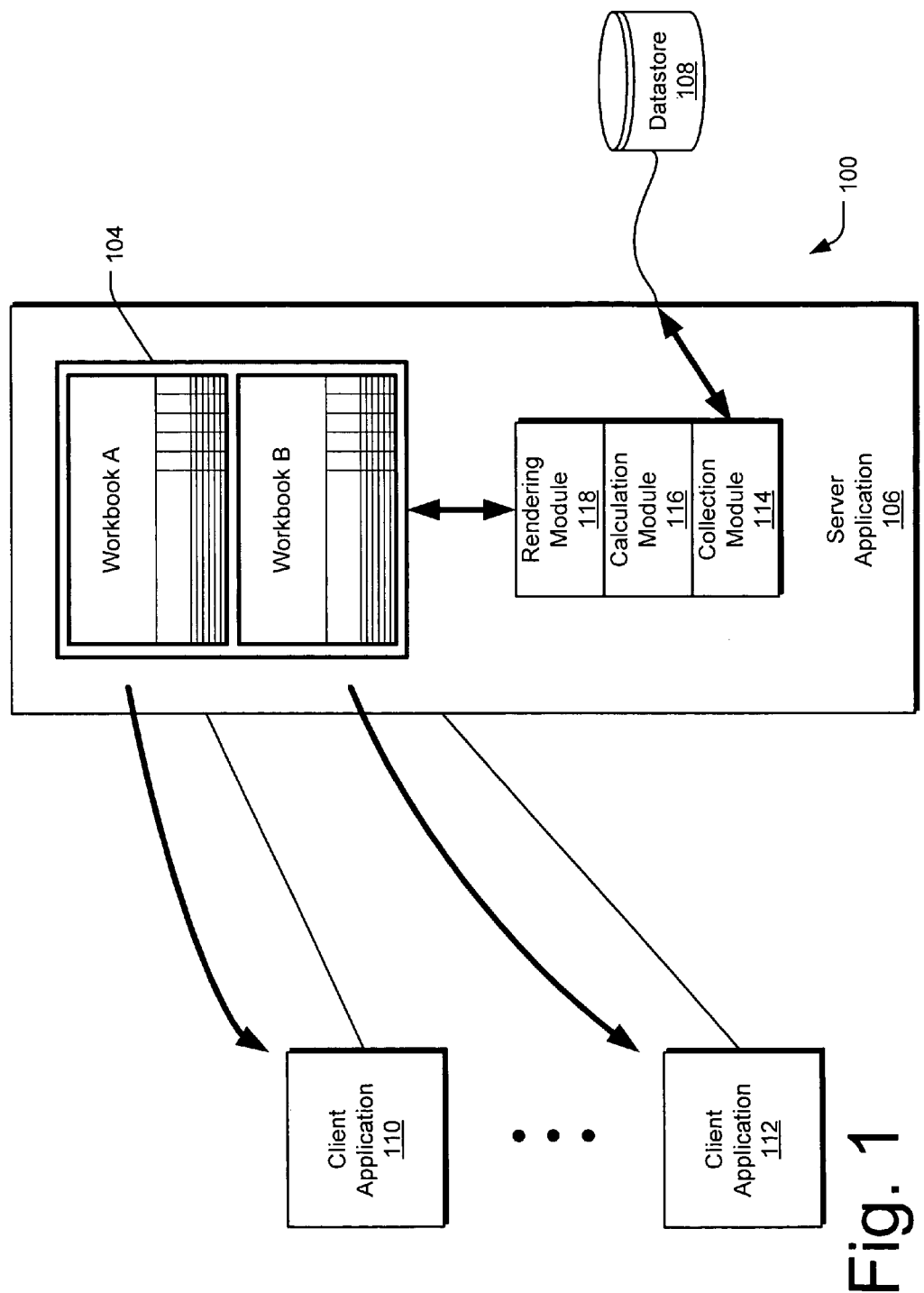
FIG. 1 illustrates an exemplary system having a server-based application that synchronizes shared resources in a collection.

FIG. 1 illustrates an exemplary system 100 having a server-based application 102 that synchronizes shared resources in a collection 104. Generally, collections are data objects that hold other related data objects (or resources). These related data objects can be accessed, placed, and maintained under some set of rules, typically through an interface exposed by the collection. For example, a Worksheets collection can contain all of the Worksheet objects in a workbook, each of which can be accessed using the worksheet name (e.g., Worksheets ("Sheet 1")).

Continuing with the Worksheets collection example in a server-based application environment, a user might request a specified spreadsheet from the server application 106. The server application 106 can retrieve the workbook file for the specified spreadsheet from one or more locally or remotely attached datastores 108. It should be understood that the server application 106 may access the datastores 108 via a direct connection, a local area network (LAN), a wide area network (WAN), or some other communications channel. The datastores 108 may also be represented by offline data storage, such as magnetic disks, magnetic tapes, optical disks, and other offline data storage devices, which can be extracted from a library and made accessible by the server application 106.

After the workbook file is opened by the server application 106, the collection 104 of worksheets is initiated and one or more of the worksheets in the workbook file are added to the collection. For example, a Worksheet A of the specified spreadsheet is built by the server application 106, which may involve building other collections and retrieving external data to populate the Worksheet A. Other users can also connect to the server application 106 and access the Worksheet A through the collection 104. If a user requests access to Worksheet B of the specified spreadsheet (i.e., before it is added to the collection 104), then the server application 106 builds the Worksheet B, adds it to the collection so that various users can also access it, and renders it for display to the user.

Users can access the server application 106 through a network via client applications, such as client applications 110 and 112. Exemplary client applications may include without limitation browsers and application-specific programs for interacting with the server application 106. In one implementation, for example, the client application 110 is an Internet browser that communicates with the server application 106 via HTTP communications. The server application 106 responds to requests from the browser by building resources (collection module 114), computing results (calculation module 116), and rendering the results as HTML data for display in the browser (rendering module 118). The server application 106 can also include a communications interface module (not shown) to communicate with the client applications and a communications interface module (not shown) to communicate with the various datastores 108.

Figure 2:
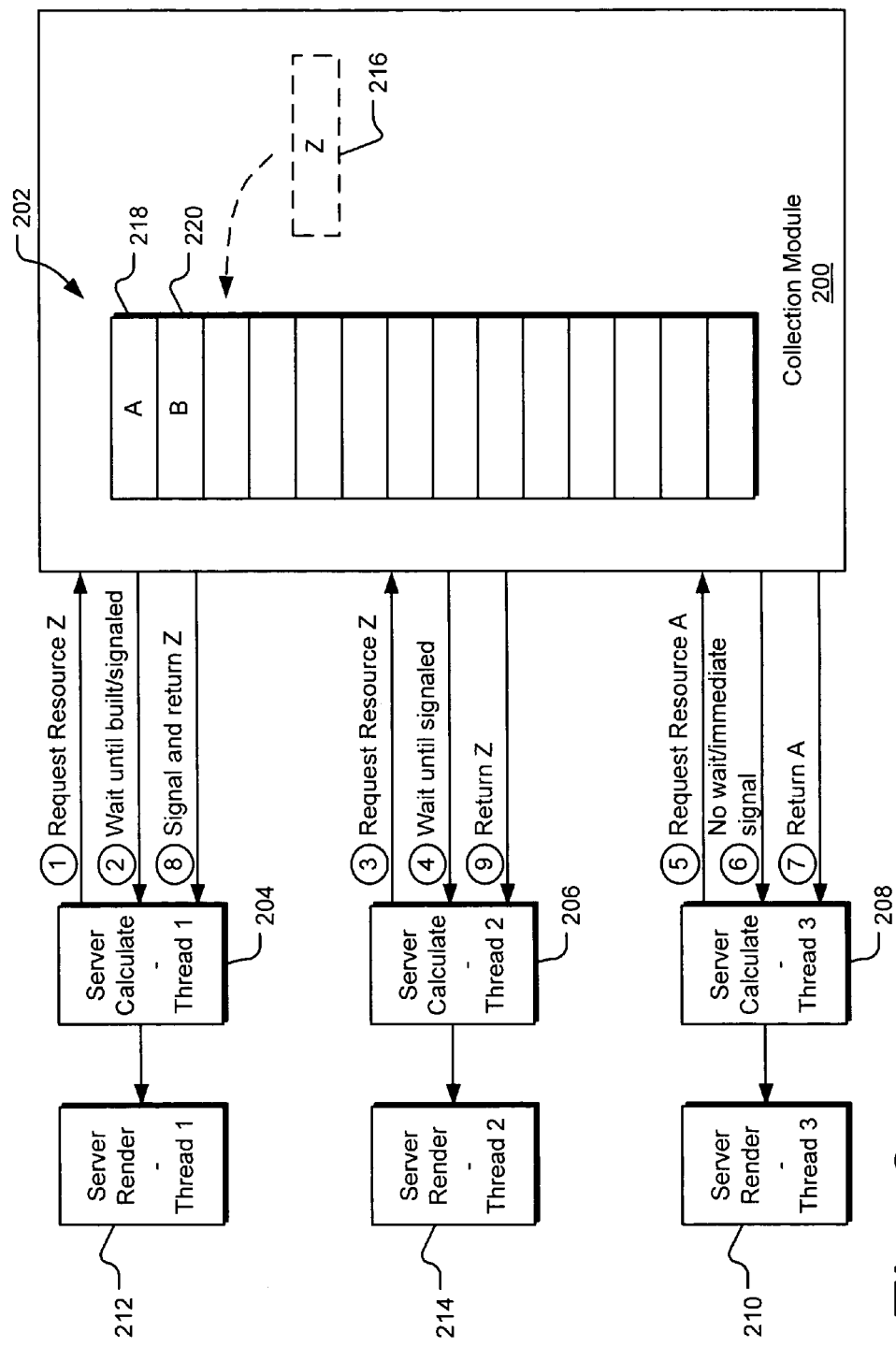
FIG. 2 illustrates exemplary states associated with software modules of various threads and a collection module.

FIG. 2 illustrates exemplary states associated with software modules of various threads and a collection module 200. Three threads (i.e., thread 1, thread 2, and thread 3) are depicted, each thread accessing a resource from a collection 202. In the illustrated implementation, the server calculate module 204 for thread 1 requests a resource Z 216 from the collection module 200 (state 1). The resource Z 216 represents an arbitrary resource, such as a worksheet data object. At the time of the request, resource A 218 and resource B 220 already reside in the collection 202, but the resource Z 216 has not yet been built or added to the collection 202. Therefore, in response to the request, thread 1 is forced to wait (state 2) until the resource Z 216 is built. Accordingly, over time, the collection module 200 parses the request, identifies the specified resource (e.g., the resource Z 216), gathers the data for the specified resource, adds the specified resource to the collection 202, and signals the thread that the resource build has completed.

However, as illustrated, after the server calculate module 204 begins to await the building of the resource Z 216, a server calculate module 206 of a thread 2 also requests the resource Z 216 (state 3). As discussed, the resource Z 216 is not yet built or added to the collection 202, so thread 2 is also forced to wait (state 4), although it is not involved with the building of the resource Z 216 (thread 1 has already initiated this).

Furthermore, as illustrated, after the server calculate module 206 begins to await the building of the resource Z216, a server calculate module 208 of a thread 3 requests the resource A 218 (state 5). Because the resource A 218 is already stored in the collection 202, the thread 3 does not need to wait. Accordingly, the resource A 218 is retrieved from the collection 202 and returned to the server calculate module 208 (state 7), which performs appropriate computations and forwards the result to the server render module 210 of thread 3 to have the result rendered into an application-specific format (e.g., HTML for a browser, a proprietary format for some other client application, etc.). The result can thereafter be returned to the client application for display to the user.

After the collection module 200 builds the resource Z 216, it signals thread 1 to wake the thread up so that the thread can retrieve the newly built resource Z 216 from the collection 202 and return it to the server calculate module 204 (state 8). The server calculate module 204 then performs appropriate computations and forwards the result to the server render module 212 of thread 1 to have the result rendered into an application-specific format and sent to a user's system.

The collection module 200 also signals any other waiting threads, such as thread 2, that the resource Z 216 is built, thereby waking up such threads and allowing them to retrieve the resource Z 216 from the collection 202. Accordingly, thread 2 wakes up so that the thread can retrieve the resource Z 216 from the collection 202 and return it to the server calculate module 206 (state 9). The server calculate module 206 then performs appropriate computations and forwards the result to the server render module 214 of thread 2 to have the result rendered into an application-specific format and sent to a user's system.

Figure 3:
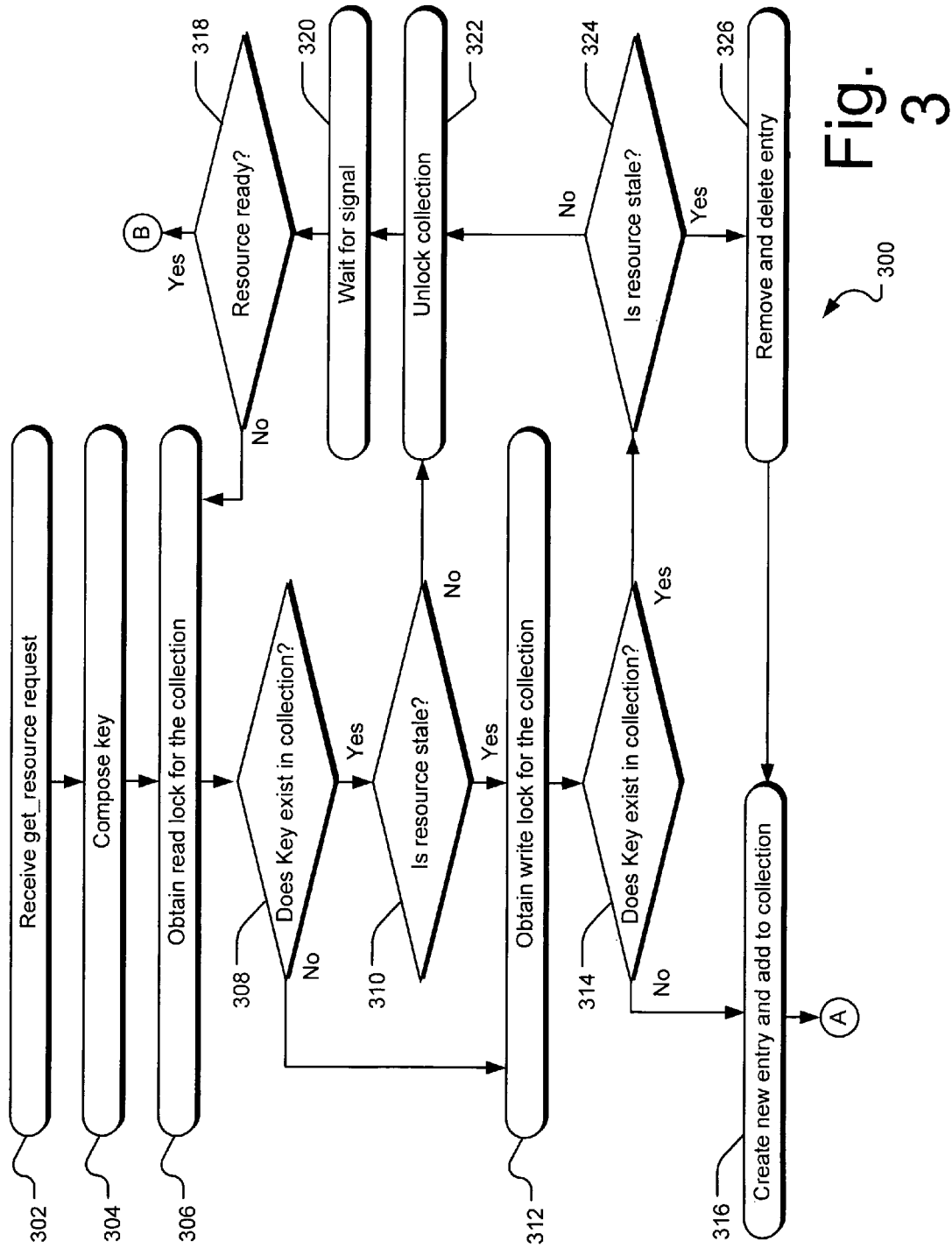
FIG. 3 illustrates exemplary operations for synchronizing access to shared resources in a collection.

FIG. 3 illustrates exemplary operations 300 for synchronizing access to shared resources in a collection. A receiving operation 302 sends a request for a specified resource. The resource may be identified by any number ways, including a file name, a URL or URI, or other resource identification mechanisms. A composition operation 304 generates a key that includes a resource identifier and potentially other parameters, such as the workbook file's name and timestamp, the language of the user who made the request, etc. It should be understood, however, that an exemplary request may include only a workbook file name and the time stamp and other information can be determined by the system using other methods (e.g., extracting the additional information from a user profile). Alternatively, other information can be included in an exemplary request and included in the composition of the key.

A locking operation 306 obtains a reader lock for a collection. Generally, a read lock is a software mechanism that allows a thread to reserve access to a resource, such that no other thread can use the resource while the lock is held. However, a reader/writer allows at least two different types of locking—a lock for read operation and a lock for write operations (i.e., a read-lock and a write-lock). A read-lock will allow other threads to read from the resource. Multiple threads can obtain a read lock for a resource, so long as no thread has first obtained a write lock. In contrast, only one thread at time can obtain a write lock to a resource. When a thread attempts to obtain a lock that is held by another thread, the thread "spins" or repeatedly retries its attempts to obtain the lock until the lock is available—note that the lock may use operating system mechanisms so that the thread can receive a signal (e.g., be awakened) when the desired resource is available. It should be understood that other locking mechanisms are also contemplated.

With the read lock, a decision operation 308 searches the collection for an occurrence of the key. If the key is found, an instance of the resource already resides in the collection. Otherwise, the resource needs to be built and added to the collection, so processing proceeds to a locking operation 312.

If the key is found in decision operation 308, another decision operation 310 determines whether the resource associated with the key is "stale". Once added to the collection, resources may be somewhat persistent, in that they are considered valid for a period of time or are considered valid subject to the occurrence of a particular event (e.g., a refresh event). In this manner, resources can be reused within the collection without requiring a rebuild for each access request. However, after a period of time, the resource is designated as stale so that it must be refreshed (e.g., rebuilt) from the original data before it is accessed in the collection again. Alternatively, the original datastores may detect a change to the underlying data of the resource and trigger a refresh event, which designates the resource as stale, thereby causing a refresh. If the resource is stale at decision operation 310 (or the resource was not found in the collection at decision operation 308), the locking operation 312 obtains a write lock for the collection.

A decision operation 314 searches for the key in the collection again, as another thread may have completed a build of the requested resource before the locking operation 312 obtained the write lock. If the key is found in the collection, the resource has been added to the collection since the decision operation 308 was performed. Accordingly, a decision operation 324 determines whether the resource is stale and, if not, processing proceeds to an unlocking operation 322. Otherwise, the resource is stale, so a removal operation 326 removes the stale resource from the collection, deletes the stale resource from memory, and proceeds to a creation operation 316. Likewise, if the decision operation 314 does not find the key in the collection, then processing proceeds to the creation operation 316. The creation operation 316 creates a resource entry (or placeholder entry) in the collection that identifies or points to the resource or the location at which the resource will be located, once it is built.

In an exemplary implementation, the resource entry serves as a placeholder for a resource that is being or about to be created into the collection. The resource entry maps one-to-one with a unique identifier of the requested resource (e.g., the requested resource's key). While the resource is being created, further requesting threads have access to the resource entry (and other resources in the collection), but will await a signal indicating that the associated resource is ready (e.g., built and accessible).

An exemplary resource entry includes the requested resource's key, an event object, and a reference to the shared resource. The event object may be accessed by a thread to determine whether the event object has received a signal indicating that the associated resource has been successfully built. If no signal has yet been received, then the thread goes quiescent until the event object receives the signal and awakens the thread.

Returning to the unlocking operation 322, at this point, the thread has determined that the requested resource entry is in the collection and is not stale. Accordingly, the read or write lock on the collection may be released so that other threads can access the collection. However, although the thread knows that the resource entry is in the collection, the resource itself may not yet be built. Accordingly, the thread gets an event object from the resource entry and waits for a signal indicating that the resource build has been completed (see operation 412 in FIG. 4) or that the resource build has failed (see operation 422 in FIG. 4). Generally, a thread waits by suspending itself (e.g., entering a quiescent state) until it detects a signal (e.g., through the event object) to wake up. If the resource was built earlier, the signal has already been issued, such that the waiting operation 320 detects the signal immediately and proceeds to the decision block 318. If the decision block 318 determines that the resource is not ready (for example, the signal may be received, but the build may have failed), processing returns to the locking operation 306 to re-attempt the resource request. If the decision block 318 determines that the resource is ready, then processing proceeds through the connector B to a return operation 428 in FIG. 4, which retrieves the resource from the collection and sends it to the requester.

Figure 4:
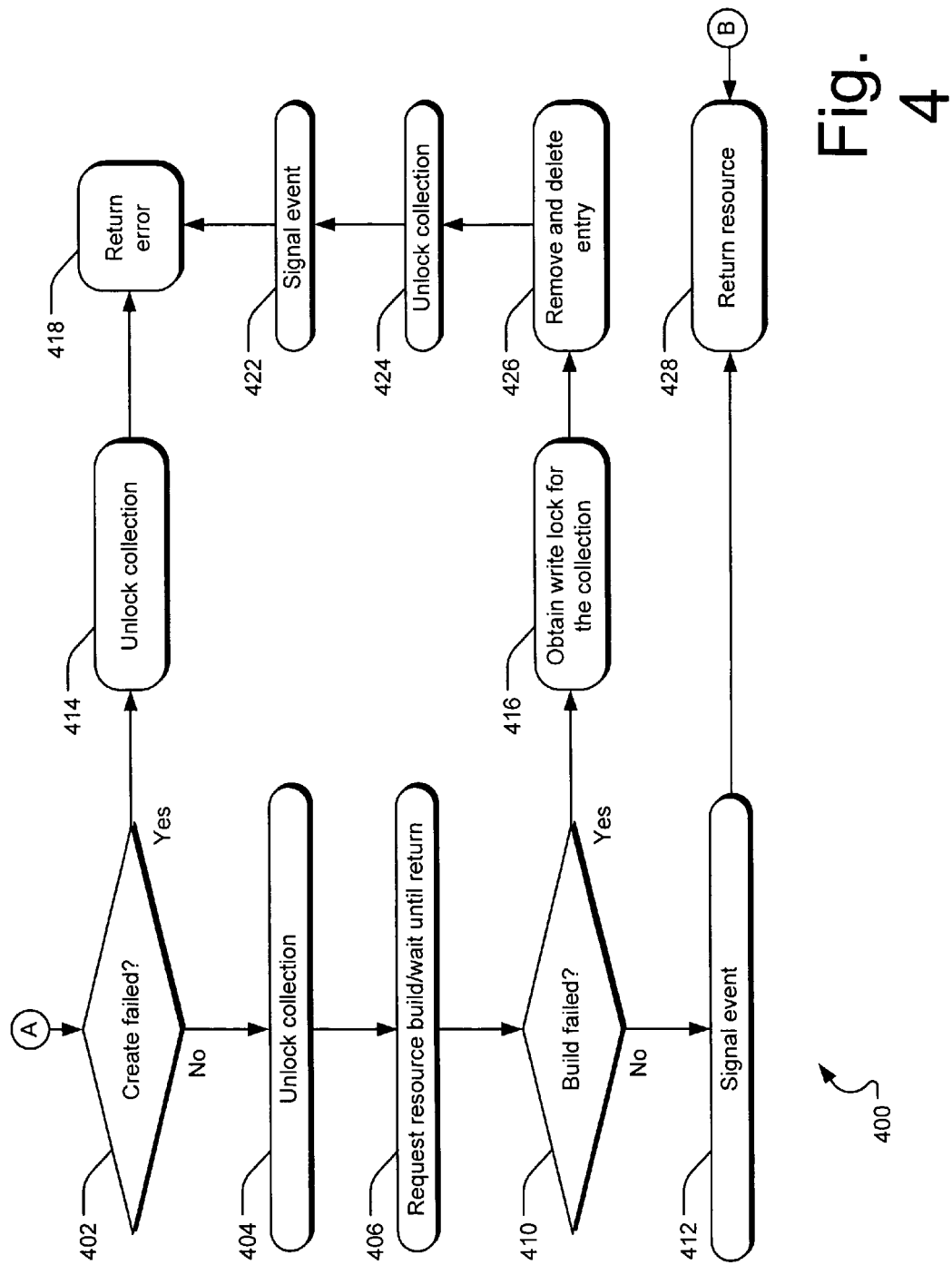
FIG. 4 illustrates additional exemplary operations for synchronizing access to shared resources in a collection.

FIG. 4 illustrates additional exemplary operations 400 for synchronizing access to shared resources in a collection. After the creation operation 316 of FIG. 3, processing proceeds through the connector A to a decision operation 402, which determines whether the creation and addition of the resource entry in the collection was successful (e.g., the creation operation 316 may fail for invalid input, lack of memory, lack of disk space, etc.). If the creation operation 402 failed, then an unlocking operation 414 unlocks the collection and an error operation 418 returns an error.

If the creation operation is successful, then an unlocking operation 404 (e.g., in a primary thread) unlocks the collection and a build operation 406 spawns a secondary thread to gather data and build the requested resource. The primary thread creates an event object that the second thread signals when it has completed. While the build operation thread is processing, the primary thread is suspended (e.g., goes quiescent), waiting for the secondary thread to signal (i.e., through the event object) the completion or failure of the resource build (similar to the wait operation 320 of FIG. 3). If the build fails, as determined by a decision operation 410, a locking operation 416 obtains a write lock for the collection, and a remove operation 426 removes the resource entry from the collection and deletes the entry from memory. Thereafter, an unlocking operation 424 releases the lock, a signaling operation 422 signals to all waiting threads that the resource build failed, and the return operation 418 returns an error.

If the decision operation 410 determines that the build was successful, then a signaling operation 412 signals all waiting threads through the event object of the resource entry indicating that the requested resource has been built, and the return operation 428 returns the resource to the requester.

The exemplary hardware and operating environment of FIG. 5 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a rendering module, a calculation module, a collection module, and other modules may be incorporated as part of the operating system 35, application programs 36, or other program modules 37. Collections, resources, resource entries, and other data may be stored as program data 38.

The technology described herein is implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. In particular, it should be understood that the described technology may be employed independent of a personal computer. Other embodiments are therefore contemplated.

What is claimed is:

1. A computer-implemented method of processing an access request for a shared resource of a collection of worksheets, the method to be performed on a computer, the computer comprising a processing unit and a memory, the method comprising:
    composing a key associated with the shared resource from the access request;
    locking the collection of worksheets using a read lock;
    determining whether the key exists in the collection;
    if the key exists in the collection:
        determining whether the shared resource associated with the key is stale;
        if the shared resource is not stale, unlocking the collection, waiting for a signal and returning the shared resource in response to the access request; if the key does not exist in the collection:
        locking the collection of worksheets using a write-lock;
        adding a resource entry to the collection of worksheets, responsive to the locking operation, the resource entry comprising an event object and a reference to the shared resource, the resource entry serving as a placeholder for the shared resource before the shared resource is built;
    prior to building the shared resource, unlocking the collection of worksheets, responsive to the adding operation;
    building the shared resource referenced by the resource entry in the collection of worksheets, responsive to the unlocking operation, the shared resource comprises a data object; and,
    accessing the event object to determine whether the event object has received a signal indicating that the shared resource has been successfully built.

2. The method of claim 1 further comprising:
    returning the shared resource in response to the access request.

3. The method of claim 1 wherein the write locking, adding, and unlocking operations are performed by a first thread, and a second thread detects the resource entry that references the shared resource in the collection of worksheets and accesses the shared resource after receiving a signal issued by the first thread.

4. The method of claim 1 wherein the write locking, adding, and unlocking operations are performed by a first thread and further comprising:
    signaling other threads awaiting access to the shared resource that the building operation has completed.

5. The method of claim 1 wherein the write locking, adding, and unlocking operations are performed by a first thread and further comprising:
   signaling other threads awaiting access to the shared resource that the building operation has failed.

6. The method of claim 1 further comprising:
computing a result based on the shared resource.

7. The method of claim 1 further comprising:
computing a result based on the shared resource; and
rendering the result for transmission and display to a user.

8. The method of claim 1 wherein the building operation comprises:
   retrieving one or more elements of the shared resource from one or more datastores.

9. The method of claim 1 wherein the write locking, adding, and unlocking operations are performed by a first thread and the building operation comprises:
   spawning a second thread to build the shared resource while the first thread awaits completion of the building operation.

10. The method of claim 9 further comprising:
   signaling the first thread to indicate that the building operation has completed.

11. The method of claim 1, wherein the collection comprises a worksheets collection of a spreadsheet application.

12. A computer-implemented system comprising:
   a computer comprising a processing unit and a memory;
   a collection of worksheets having storage for a plurality of resource entries;
   a first thread module that:
      composes a key associated with a shared resource from an access request,
      locks the collection of worksheets using a read lock,
      determines whether the key exists in the collection,
      if the key exists in the collection:
         determines whether the shared resource associated with the key is stale,
         if the shared resource is not stale, unlocking the collection, waiting for a signal and returning the shared resource in response to the access request;
      if the key does not exist in the collection:
         locks the collection of worksheets using a write-lock,
         then adds a resource entry to the collection of worksheets, the resource entry comprising an event object and a reference to the shared resource, the shared resource comprises a data object, and then
         prior to building the shared resource, unlocks the collection of worksheets, responsive to the adding operation, the resource entry serving as a placeholder for the shared resource before the shared resource is built;
   a second thread module that, responsive to unlocking of the collection of worksheets, builds a shared resource that is referenced by the resource entry in the collection of worksheets, wherein the first thread module further accesses the event object to determine whether the event object has received a signal indicating that the shared resource has been successfully built.

13. The system of claim 12 further comprising:
a third thread module that detects the resource entry in the collection of worksheets, wherein the resource entry references the shared resource and the third thread module accesses the shared resource after receiving the signal.

* * * * *